United States Patent [19]
Yianakopoulos et al.

[11] Patent Number: 5,958,856
[45] Date of Patent: Sep. 28, 1999

[54] LIQUID CRYSTAL COMPOSITIONS CONTAINING A POLYETHYLENE ABRASIVE

[75] Inventors: Georges Yianakopoulos, Liege; Genevieve Blandiaux, Trooz; Myriam Mondin, Seriang, all of Belgium

[73] Assignee: Colgate-Palmolive Co, Piscataway, N.J.

[21] Appl. No.: 08/919,793

[22] Filed: Aug. 29, 1997

Related U.S. Application Data

[63] Continuation-in-part of application No. 08/611,924, Mar. 6, 1996, abandoned, which is a continuation-in-part of application No. 08/334,107, Nov. 4, 1994, Pat. No. 5,523,013, which is a continuation-in-part of application No. 08/096,501, Sep. 3, 1993, abandoned, which is a continuation of application No. 07/726,597, Jul. 8, 1991, abandoned, which is a continuation of application No. 07/411,280, Sep. 22, 1989, Pat. No. 5,035,826.

[51] Int. Cl.$^6$ .............................. C11D 17/00; C11D 3/38; C11D 3/02

[52] U.S. Cl. ...................... 510/236; 510/365; 510/422; 510/424; 510/426; 510/432; 510/463; 510/508

[58] Field of Search ...................... 510/426, 236, 510/365, 432, 427, 368, 369, 422, 424

[56] References Cited

U.S. PATENT DOCUMENTS

| | | | |
|---|---|---|---|
| 4,122,025 | 10/1978 | Kiewert et al. | 252/173 |
| 4,240,919 | 12/1980 | Champman | 252/98 |
| 4,576,738 | 3/1986 | Colodney et al. | 252/559 |
| 4,767,563 | 8/1988 | De Buzzaccarini | 252/174.25 |
| 5,723,431 | 3/1998 | Yianakopoulos et al. | 510/426 |
| 5,741,770 | 4/1998 | Yianakopoulos et al. | 510/426 |

*Primary Examiner*—Necholus Ogden
*Attorney, Agent, or Firm*—Richard E. Nanfeldt

[57] ABSTRACT

This invention relates to a liquid crystal composition comprising a water insoluble organic compound, a nonionic surfactant, an abrasive, an ethoxylated alkyl ether sulfate surfactant, a cosurfactant and water.

3 Claims, No Drawings

LIQUID CRYSTAL COMPOSITIONS CONTAINING A POLYETHYLENE ABRASIVE

RELATED APPLICATION

This application is a continuation in part application of U.S. Ser. No. 8/611,924 filed Mar. 6, 1996 now abandoned which in turn is a continuation in part application of U.S. Ser. No. 8/334,107 filed Nov. 4, 1994 now U.S. Pat. No. 5,523,013 which in turn is a continuation in part application of U.S. Ser. No. 8/096,501 filed Nov. 3, 1993 now abandoned which in turn is a continuation application of U.S. Ser. No. 7/726,597 filed Jul. 8, 1991 now abandoned which in turn is a continuation application of U.S. Ser. No. 7/411,280 filed Sep. 22, 1989 now U.S. Pat. No. 5,015,826.

FIELD OF THE INVENTION

This invention relates to a liquid crystal detergent composition containing an abrasive. More specifically, it is of a liquid detergent composition in liquid crystal state which when brought into contact with oily soil is superior to other liquid detergent compositions in detergency and in other physical properties.

BACKGROUND OF THE INVENTION

Liquid aqueous synthetic organic detergent compositions have long been employed for human hair shampoos and as dishwashing detergents for hand washing of dishes (as distinguished from automatic dishwashing machine washing of dishes). Liquid detergent compositions have also been employed as hard surface cleaners, as in pine oil liquids, for cleaning floors and walls. More recently they have proven successful as laundry detergents too, apparently because they are convenient to use, are instantly soluble in wash water, and may be employed in "pre-spotting" applications to facilitate removals of soils and stains from laundry upon subsequent washing. Liquid detergent compositions have comprised anionic, cationic and nonionic surface active agents, builders and adjuvants, including, as adjuvants, lipophilic materials which can act as solvents for lipophilic soils and stains. The various liquid aqueous synthetic organic detergent compositions mentioned serve to emulsify lipophilic materials, including oily soils, in aqueous media, such as wash water, by forming micellar dispersions and emulsions.

Although emulsification is a mechanism of soil removal, it has been only comparatively recently that it was discovered how to make microemulsions which are much more effective than ordinary emulsions in removing lipophilic materials from substrates. Such microemulsions are described in British Patent Specification No. 2,190,681 and in U.S. Pat. Nos. 5,075,026; 5,076,954 and 5,082,584 and 5,108,643, most of which relate to acidic microemulsions useful for cleaning hard surfaced items, such as bathtubs and sinks which microemulsions are especially effective in removing soap scum and lime scale from them. However, as in U.S. Pat. No. 4,919,839 the microemulsions may be essentially neutral and such are also taught to be effective for microemulsifying lipophilic soils from substrates. In U.S. patent application Ser. No. 7/313,664 there is described a light duty microemulsion liquid detergent composition which is useful for washing dishes and removing greasy deposits from them in both neat and diluted forms. Such compositions include complexes of anionic and cationic detergents as surface active components of the microemulsions.

The various microemulsions referred to include a lipophile, which may be a hydrocarbon, a surfactant, which may be an anionic and/or a nonionic detergent(s), a co-surfactant, which may be a poly-lower alkylene glycol lower alkyl ether, e.g., tripropylene glycol monomethyl ether, and water.

Although the manufacture and use of detergent compositions in microemulsion form significantly improved cleaning power and greasy soil removal, compared to the usual emulsions, the present invention improves them still further and also increases the capacity of the detergent compositions to adhere to surfaces to which they have been applied. Thus, they drop or run substantially less than cleaning compositions of "similar" cleaning power which are in microemulsion or normal liquid detergent form. Also, because they form microemulsions with lipophilic soil or stain material spontaneously, with essentially no requirement for addition of any energy, either thermal or mechanical, they are more effective cleaners at room temperature and at higher and lower temperatures that are normally employed in cleaning operations than are ordinary liquid detergents, and are also more effective than detergent compositions in microemulsion form.

The present liquid crystal detergent compositions may be either clear or somewhat cloudy or milky (opalescent) in appearance but both forms thereof are stable on storage and components thereof do not settle out or become ineffective, even on storage at somewhat elevated temperatures for periods as long as six months and up to a year. The presence of the cosurfactant in the liquid crystal detergent compositions helps to make such compositions resist freezing at low temperatures.

In accordance with the present invention a liquid detergent composition containing an abrasive, suitable at room temperature or colder, for pre-treating and cleaning materials soiled with lipophilic soil, is in liquid crystal form and comprises synthetic organic surface active agents, a cosurfactant, a solvent for the soil, and water. The invention also relates to processes for treating items and materials soiled with lipophilic soil with compositions of this invention to loosen or remove such soil, by applying to the locus of such soil on such material a soil loosening or removing amount of an invented composition. In another aspect of the invention lipophilic soil is absorbed from the soiled surface into the liquid crystal.

In recent years all-purpose liquid detergents have become widely accepted for cleaning hard surfaces, e.g., painted woodwork and panels, tiled walls, wash bowls, bathtubs, linoleum or tile floors, washable wall paper, etc. Such all-purpose liquids comprise clear and opaque aqueous mixtures of water-soluble synthetic organic detergents and water-soluble detergent builder salts. In order to achieve comparable cleaning efficiency with granular or powdered all-purpose cleaning compositions, use of water-soluble inorganic phosphate builder salts was favored in the prior art all-purpose liquids. For example, such early phosphate-containing compositions are described in U.S. Pat. Nos. 2,560,839; 3,234,138; 3,350,319; and British Patent No. 1,223,739.

In view of the environmentalist's efforts to reduce phosphate levels in ground water, improved all-purpose liquids containing reduced concentrations of inorganic phosphate builder salts or non-phosphate builder salts have appeared. A particularly useful self-opacified liquid of the latter type is described in U.S. Pat. No. 4,244,840.

However, these prior art all-purpose liquid detergents containing detergent builder salts or other equivalent tend to leave films, spots or streaks on cleaned unrinsed surfaces, particularly shiny surfaces. Thus, such liquids require thorough rinsing of the cleaned surfaces which is a time-consuming chore for the user.

In order to overcome the foregoing disadvantage of the prior art all-purpose liquid, U.S. Pat. No. 4,017,409 teaches that a mixture of paraffin sulfonate and a reduced concentration of inorganic phosphate builder salt should be employed. However, such compositions are not completely acceptable from an environmental point of view based upon the phosphate content. On the other hand, another alternative to achieving phosphate-free all-purpose liquids has been to use a major proportion of a mixture of anionic and nonionic detergents with minor amounts of glycol ether solvent and organic amine as shown in U.S. Pat. No. 3,935,130. Again, this approach has not been completely satisfactory and the high levels of organic detergents necessary to achieve cleaning cause foaming which, in turn, leads to the need for thorough rinsing which has been found to be undesirable to today's consumers.

Another approach to formulating hard surfaced or all-purpose liquid detergent composition where product homogeneity and clarity are important considerations involves the formation of oil-in-water (o/w) microemulsions which contain one or more surface-active detergent compounds, a water-immiscible solvent (typically a hydrocarbon solvent), water and a "cosurfactant" compound which provides product stability. By definition, an o/w microemulsion is a spontaneously forming colloidal dispersion of "oil" phase particles having a particle size in the range of 25 to 800 Å in a continuous aqueous phase.

In view of the extremely fine particle size of the dispersed oil phase particles, microemulsions are transparent to light and are clear and usually highly stable against phase separation.

Patent disclosures relating to use of grease-removal solvents in o/w microemulsions include, for example, European Patent Applications EP 0137615 and EP 0137616—Herbots et al; European Patent Application EP 0160762—Johnston et al; and U.S. Pat. No. 4,561,991—Herbots et al. Each of these patent disclosures also teaches using at least 5% by weight of grease-removal solvent.

It also is known from British Patent Application GB 2144763A to Herbots et al, published Mar. 13,1985, that magnesium salts enhance grease-removal performance of organic grease-removal solvents, such as the terpenes, in o/w microemulsion liquid detergent compositions. The compositions of this invention described by Herbots et al. require at least 5% of the mixture of grease-removal solvent and magnesium salt and preferably at least 5% of solvent (which may be a mixture of water-immiscible non-polar solvent with a sparingly soluble slightly polar solvent) and at least 0.1% magnesium salt.

The following representative prior art patents also relate to liquid detergent cleaning compositions in the form of o/w microemulsions: U.S. Pat. No. 4,472,291—Rosario; U.S. Pat. No. 4,540,448—Gauteer et al; U.S. Pat. No. 3,723,330—Sheflin; et al.

Liquid detergent compositions which include terpenes, such as d-limonene, or other grease-removal solvent, although not disclosed to be in the form of o/w microemulsions, are the subject matter of the following representative patent documents: European Patent Application 0080749; British Patent Specification 1,603,047; and U.S. Pat. Nos. 4,414,128 and 4,540,505. For example, U.S. Pat. No. 4,414,128 broadly discloses an aqueous liquid detergent composition characterized by, by weight:

(a) from 1% to 20% of a synthetic anionic, nonionic, amphoteric or zwitterionic surfactant or mixture thereof;

(b) from 0.5% to 10% of a mono- or sesquiterpene or mixture thereof, at a weight ratio of (a):(b) being in the range of 5:1 to 1:3; and (c) from 0.5% to 20% of a polar solvent having a solubility in water at 15° C. in the range of from 0.2% to 10%. Other ingredients present in the formulations disclosed in this patent include from 0.05% to 10% by weight of an alkali metal, ammonium or alkanolammonium soap of a $C_{13}$–$C_{24}$ fatty acid; a calcium sequestrant from 0.5% to 13% by weight; non-aqueous solvent, e.g., alcohols and glycol ethers, up to 10% by weight; and hydrotropes, e.g., urea, ethanolamines, salts of lower alkylaryl sulfonates, up to 10% by weight. All of the formulations shown in the Examples of this patent include relatively large amounts of detergent builder salts which are detrimental to surface shine.

U.S. Pat. No. 5,035,826 teaches liquid crystal compositions but these compositions exhibit thermal stability in the limited temperature range of 19° C. to 36° C.

SUMMARY OF THE INVENTION

The present invention relates to improved, liquid crystal detergent compositions containing an abrasive. The compositions have improved scouring ability and interfacial tension which improves the cleaning of hard surface such as plastic, vitreous and metal surfaces having a shiny finish, oil stained floors, automative engines and other engines. More particularly, the improved cleaning compositions exhibit good scouring power and grease soil removal properties due to the improved interfacial tensions and leave the cleaned surfaces shiny without the need of or requiring only minimal additional rinsing or wiping. The latter characteristic is evidenced by little or no visible residues on the unrinsed cleaned surfaces and, accordingly, overcomes one of the disadvantages of prior art products.

Surprisingly, these desirable results are accomplished even in the absence of polyphosphate or other inorganic or organic detergent builder salts and also in the complete absence or substantially complete absence of grease-removal solvent.

In one aspect, the invention generally provides a stable, liquid crystal, hard surface cleaning composition especially effective in the removal of oily and greasy oil. The liquid crystal composition includes, on a weight basis:

1% to 20% of an ethoxylated alkyl ether sulfate surfactant or sodium lauryl sulfate (SLS);

1% to 30% of a water-mixable cosurfactant having either limited ability or substantially no ability to dissolve oily or greasy soil;

1% to 30% of an ethoxylated nonionic surfactant;

1% to 10% of a magnesium salt such as magnesium sulfate heptahydrate or magnesium chloride;

0.6% to 10% of a perfume, essential oil, or water insoluble hydrocarbon having 6 to 18 carbon atoms;

0.1% to 10% of an abrasive; and the balance being water, wherein the liquid crystal detergent composition does not contain any sulfonate or sulfosuccinic acid surfactant or calcite or an alkali metal salt or an alkali metal detergent builder salt, and the liquid detergent composition has a storage modulus equal to or higher than one Pascal (1 Newton/sq. m.), more preferably higher than 10 Pascal at a temperature of 20° C. to 40° C. at a strain of 0.1% to 5% second as measured on a Carr-Med CS Rheometer and is thermally stable and exist as a clear liquid crystal in the temperature range from 8° C. to 43° C., more preferably 4° C. to 43° C.

DETAILED DESCRIPTION OF THE INVENTION

The present invention relates to a stable liquid crystal detergent composition comprising approximately by weight: 1% to 20% of an ethoxylated alkyl ether sulfate or sodium lauryl sulfate (SLS) surfactant, 1% to 30% of a cosurfactant, 1% to 30% of an ethoxylated nonionic surfactant, 0.6% to 10% of a water insoluble hydrocarbon, essential oil or a perfume, 0.1% to 10% of an abrasive, and the balance being water, wherein the liquid detergent composition does not contain any sulfonate surfactant, and the liquid detergent composition has a storage modulus equal to or higher than one Pascal (1 Newton/sq. m.), more preferably higher than 10 Pascal at a temperature of 20° C. to 40° C. at a strain of 0.1% to 5% second as measured on a Carr-Med CS Rheometer and is thermally stable and exist as a liquid crystal in the temperature range from 10° C. to 45° C., more preferably 4° C. to 43° C.

According to the present invention, the role of the water insoluble hydrocarbon can be provided by a non-water-soluble perfume. Typically, in aqueous based compositions the presence of a solubilizers, such as alkali metal lower alkyl aryl sulfonate hydrotrope, triethanolamine, urea, etc., is required for perfume dissolution, especially at perfume levels of 1% and higher, since perfumes are generally a mixture of fragrant essential oils and aromatic compounds which are generally not water-soluble.

As used herein and in the appended claims the term "perfume" is used in its ordinary sense to refer to and include any non-water soluble fragrant substance or mixture of substances including natural (i.e., obtained by extraction of flower, herb, blossom or plant), artificial (i.e., mixture of natural oils or oil constituents) and synthetically produced substance) odoriferous substances. Typically, perfumes are complex mixtures of blends of various organic compounds such as alcohols, aldehydes, ethers, aromatic compounds and varying amounts of essential oils (e.g., terpenes) such as from 0% to 80%, usually from 10% to 70% by weight, the essential oils themselves being volatile odoriferous compounds and also serving to dissolve the other components of the perfume.

Quite surprisingly although the perfume is not, per se, a solvent for greasy or oily soil,—even though some perfumes may, in fact, contain as much as 80% of terpenes which are known as good grease solvents—the inventive compositions in dilute form have the capacity to solubilize up to 10 times or more of the weight of the perfume of oily and greasy soil, which is removed or loosened from the hard surface by virtue of the action of the anionic and nonionic surfactants, said soil being taken up into the oil phase of the o/w microemulsion.

In the present invention the precise composition of the perfume is of no particular consequence to cleaning performance so long as it meets the criteria of water immiscibility and having a pleasing odor. Naturally, of course, especially for cleaning compositions intended for use in the home, the perfume, as well as all other ingredients, should be cosmetically acceptable, i.e., non-toxic, hypoallergenic, etc.

The hydrocarbon such as a perfume is present in the liquid crystal composition in an amount of from 0.6% to 10% by weight, preferably from 0.8% to 8% by weight, especially preferably from 1% to 6% by weight. If the amount of hydrocarbon (perfume) is less than 0.6% by weight it becomes difficult to form the liquid crystal. If the hydrocarbon (perfume) is added in amounts more than 10% by weight, the cost is increased without any additional cleaning benefit and, in fact, with some diminishing of cleaning performance insofar as the total amount of greasy or oily soil which can be taken up in the oil phase of the microemulsion will decrease proportionately.

Furthermore, although superior grease removal performance will be achieved for perfume compositions not containing any terpene solvents, it is apparently difficult for perfumers to formulate sufficiently inexpensive perfume compositions for products of this type (i.e., very cost sensitive consumer-type products) which includes less than 20%, usually less than 30%, of such terpene solvents.

Thus, merely as a practical matter, based on economic consideration, the liquid crystal cleaning compositions of the present invention may often include as much as 0.2% to 7% by weight, based on the total composition, of terpene solvents introduced thereunto via the perfume component. However, even when the amount of terpene solvent in the cleaning formulation is less than 1.5% by weight, such as up to 0.6% by weight or 0.4% by weight or less, satisfactory grease removal and oil removal capacity is provided by the inventive compositions.

In place of the perfume in either the microemulsion composition or the all purpose hard surface cleaning composition at the same previously defined concentrations that the perfume was used in either the microemulsion or the all purpose hard surface cleaning composition one can employ an essential oil or a water insoluble organic compound such as a water insoluble hydrocarbon having 6 to 18 carbon such as a paraffin or isoparaffin such as isoparH, isodecane, alpha-pinene, beta-pinene, decanol and terpineol.

Suitable essential oils are selected from the group consisting of: Anethole 20/21 natural, Aniseed oil china star, Aniseed oil globe brand, Balsam (Peru), Basil oil (India), Black pepper oil, Black pepper oleoresin 40/20, Bois de Rose (Brazil) FOB, Borneol Flakes (China), Camphor oil, White, Camphor powder synthetic technical, Cananga oil (Java), Cardamom oil, Cassia oil (China), Cedarwood oil (China) BP, Cinnamon bark oil, Cinnamon leaf oil, Citronella oil, Clove bud oil, Clove leaf, Coriander (Russia), Coumarin 69° C. (China), Cyclamen Aldehyde, Diphenyl oxide, Ethyl vanilin, Eucalyptol, Eucalyptus oil, Eucalyptus citriodora, Fennel oil, Geranium oil, Ginger oil, Ginger oleoresin (India), White grapefruit oil, Guaiacwood oil, Gurjun balsam, Heliotropin, Isobornyl acetate, Isolongifolene, Juniper berry oil, L-methyl acetate, Lavender oil, Lemon oil, Lemongrass oil, Lime oil distilled, Litsea Cubeba oil, Longifolene, Menthol crystals, Methyl cedryl ketone, Methyl chavicol, Methyl salicylate, Musk ambrette, Musk ketone, Musk xylol, Nutmeg oil, Orange oil, Patchouli oil, Peppermint oil, Phenyl ethyl alcohol, Pimento berry oil, Pimento leaf oil, Rosalin, Sandalwood oil, Sandenol, Sage oil, Clary sage, Sassafras oil, Spearmint oil, Spike lavender, Tagetes, Tea tree oil, Vanilin, Vetyver oil (Java), Wintergreen.

The nonionic surfactant is present in amounts of about 1% to 30%, preferably 3% to 18% by weight of the liquid crystal composition and provides superior performance in the removal of oily soil and mildness to human skin.

The water soluble ethoxylated nonionic surfactants utilized in this invention are commercially well known and include the primary aliphatic alcohol ethoxylates and secondary aliphatic alcohol ethoxylates. The length of the polyethenoxy chain can be adjusted to achieve the desired balance between the hydrophobic and hydrophilic elements.

The nonionic surfactant class includes the condensation products of a higher alcohol (e.g., an alkanol containing about 8 to 16 carbon atoms in a straight or branched chain configuration) condensed with about 4 to 20 moles of ethylene oxide, for example, lauryl or myristyl alcohol condensed with about 16 moles of ethylene oxide (EO), tridecanol condensed with about 6 to moles of EO, myristyl alcohol condensed with about 10 moles of EO per mole of myristyl alcohol, the condensation product of EO with a cut of coconut fatty alcohol containing a mixture of fatty alcohols with alkyl chains varying from 10 to about 14 carbon atoms in length and wherein the condensate contains either about 6 moles of EO per mole of total alcohol or about 9 moles of EO per mole of alcohol and tallow alcohol ethoxylates containing 6 EO to 11 EO per mole of alcohol.

A preferred group of the foregoing nonionic surfactants are the Neodol ethoxylates (Shell Co.), which are higher aliphatic, primary alcohol containing about 9–15 carbon atoms, such as $C_9$–$C_{11}$ alkanol condensed with 4 to 10 moles of ethylene oxide (Neodol 91-8 or Neodol 91-5), $C_{12-13}$ alkanol condensed with 6.5 moles ethylene oxide (Neodol 23-6.5), $C_{12-15}$ alkanol condensed with 12 moles ethylene oxide (Neodol 25-12), $C_{14-15}$ alkanol condensed with 13 moles ethylene oxide (Neodol 45-13), and the like. Such ethoxamers have an HLB (hydrophobic lipophilic balance) value of about 8 to 15 and give good O/W emulsification, whereas ethoxamers with HLB values below 7 contain less than 4 ethyleneoxide groups and tend to be poor emulsifiers and poor detergents.

Additional satisfactory water soluble alcohol ethylene oxide condensates are the condensation products of a secondary aliphatic alcohol containing 8 to 18 carbon atoms in a straight or branched chain configuration condensed with 5 to 30 moles of ethylene oxide. Examples of commercially available nonionic detergents of the foregoing type are $C_{11}$–$C_{15}$ secondary alkanol condensed with either 9 EO (Tergitol 15-S-9) or 12 EO (Tergitol 15-S-12) marketed by Union Carbide.

The ethoxylated alkyl ether sulfate or sodium lauryl sulfate (SLS) surfactants which may be used in the composition of this invention are water soluble salts such as sodium, potassium, ammonium, triethanolamine and ethanolammonium salts of an $C_{8-18}$ ethoxylated alkyl ether sulfate surfactants have the structure:

wherein n is about 0 (if n=0 then it is SLS) to about 5 and R is an alkyl group having about 8 to about 18 carbon atoms, more preferably 12 to 15 and natural cuts, for example, $C_{12-14}$; $C_{12-15}$ and M is an ammonium cation or a metal cation, most preferably sodium. The ethoxylated alkyl ether sulfate surfactant is present in the composition at a concentration of about 1% to about 20% by weight, more preferably about 2% to 15% by weight.

The ethoxylated alkyl ether sulfate or SLS may be made by sulfating the condensation product of ethylene oxide and $C_{8-10}$ alkanol, and neutralizing the resultant product. The ethoxylated alkyl ether sulfates differ from one another in the number of carbon atoms in the alcohols and in the number of moles of ethylene oxide reacted with one mole of such alcohol. Preferred ethoxylated alkyl ether polyethenoxy sulfates contain 12 to 15 carbon atoms in the alcohols and in the alkyl groups thereof, e.g., sodium myristyl (3 EO) sulfate.

Ethoxylated $C_{8-18}$ alkylphenyl ether sulfates containing from 2 to 6 moles of ethylene oxide in the molecule are also suitable for use in the invention compositions. These detergents can be prepared by reacting an alkyl phenol with 2 to 6 moles of ethylene oxide and sulfating and neutralizing the resultant ethoxylated alkylphenol. The concentration of the ethoxylated alkyl ether sulfate surfactant is about 1 to about 8 wt. %.

The major class of compounds found to provide highly suitable cosurfactants for the microemulsion over temperature ranges extending from 5° C. to 43° C. for instance are glycerol, ethylene glycol, water-soluble polyethylene glycols having a molecular weight of 300 to 1000, polypropylene glycol of the formula $HO(CH_3CHCH_2O)_nH$ wherein n is a number from 2 to 18, mixtures of polyethylene glycol and polypropyl glycol (Synalox) and mono $C_1$–$C_6$ alkyl ethers and esters of ethylene glycol and propylene glycol having the structural formulas $R(X)_nOH$ and $R_1(X)_nOH$ wherein R is $C_1$–$C_6$ alkyl group, $R_1$ is $C_2$–$C_4$ acyl group, X is $(OCH_2CH_2)$ or $(OCH_2(CH_3)CH)$ and n is a number from 1 to 4, diethylene glycol, triethylene glycol, an alkyl lactate, wherein the alkyl group has 1 to 6 carbon atoms, 1methoxy-2-propanol, 1methoxy-3-propanol, and 1methoxy 2-, 3- or 4-butanol.

Representative members of the polypropylene glycol include dipropylene glycol and polypropylene glycol having a molecular weight of 200 to 1000, e.g., polypropylene glycol 400. Other satisfactory glycol ethers are ethylene glycol monobutyl ether (butyl cellosolve), diethylene glycol monobutyl ether (butyl carbitol), triethylene glycol monobutyl ether, mono, di, tri propylene glycol monobutyl ether, tetraethylene glycol monobutyl ether, mono, di, tripropylene glycol monomethyl ether, propylene glycol monomethyl ether, ethylene glycol monohexyl ether, diethylene glycol monohexyl ether, propylene glycol tertiary butyl ether, ethylene glycol monoethyl ether, ethylene glycol monomethyl ether, ethylene glycol monopropyl ether, ethylene glycol monopentyl ether, diethylene glycol monomethyl ether, diethylene glycol monoethyl ether, diethylene glycol monopropyl ether, diethylene glycol monopentyl ether, triethylene glycol monomethyl ether, triethylene glycol monoethyl ether, triethylene glycol monopropyl ether, triethylene glycol monopentyl ether, triethylene glycol monohexyl ether, mono, di, tripropylene glycol monoethyl ether, mono, di tripropylene glycol monopropyl ether, mono, di, tripropylene glycol monopentyl ether, mono, di, tripropylene glycol monohexyl ether, mono, di, tributylene glycol mono methyl ether, mono, di, tributylene glycol monoethyl ether, mono, di, tributylene glycol monopropyl ether, mono, di, tributylene glycol monobutyl ether, mono, di, tributylene glycol monopentyl ether and mono, di, tributylene glycol monohexyl ether, ethylene glycol monoacetate and dipropylene glycol propionate. Tripropylene glycol n-butyl ether is the preferred cosurfactant because of its hydrophobic character.

The amount of cosurfactant required to stabilize the liquid crystal compositions will, of course, depend on such factors as the surface tension characteristics of the cosurfactant, the type and amounts of the primary surfactants and perfumes, and the type and amounts of any other additional ingredients which may be present in the composition and which have an influence on the thermodynamic factors enumerated above. Generally, amounts of cosurfactant used in the liquid crystal composition is in the range of from 1% to 30%, preferably from 2% to 20%, especially preferably from 3% to 16%, by weight provide stable dilute liquid crystal composition for the above-described levels of primary surfactants and perfume and any other additional ingredients as described below.

The instant liquid crystal compositions contain about 0.1 to 2.5 wt. %, more preferably 0.25 to 2.0 wt. % of an abrasive selected from the group consisting of amorphous hydrated silica and polyethylene powder particles and mixtures thereof.

The amorphous silica (oral grade) used to enhance the scouring ability of the liquid crystal gel was provided by Zeoffin. The mean particles size of Zeoffin silica is about 8 up to about 10 mm. Its apparent density is about 0.32 to about 0.37 g/ml.

An amorphous hydrated silica from Crosfield of different particles sizes (9, 15 and 300 mm), and same apparent density can also be used.

The polyethylene powder used in the instant invention has a particle size of about 200 to about 500 microns and a density of about 0.91 to about 0.99 g/liter, more preferably about 0.94 to about 0.96.

In addition to their excellent scouring ability and capacity for cleaning greasy and oily soils, the low pH liquid crystal formulations also exhibit excellent cleaning performance and removal of soap scum and lime scale in neat (undiluted) as well as in diluted usage.

The instant composition contains about 0.5 to about 10 wt. %, more preferably about 1 to about 8 wt. % of a magnesium salt such as magnesium chloride and/or magnesium sulfate heptahydrate and mixtures thereof.

The final essential ingredient in the inventive microemulsion compositions having improved interfacial tension properties is water. The proportion of water in the liquid crystal detergent composition generally is in the range of 20% to 97%, preferably 70% to 97% by weight.

A composition of this invention is in a liquid crystal state when it is of lypotropic structure, is transparent or slightly turbid (opalescent) but no opaque, and has a storage modulus equal to or higher than one Pascal (1 Newton/sq. m.), more preferably higher than 10 Pascal and most preferably higher than 20 Pascal and when measured at a temperature of 20 to 40° C., at a frequency of ten radians per second and at a strain of 0.1 to 5%. The rheological behavior of the compositions of this invention were measured at 25° C. by means of a Carri-Med CS Rheometer. In making the measurement, a cone and plate are used at a cone angle of 2 degrees: 0 minutes: 0 seconds with a cone diameter of 6.0 cm, measurement system gap of 52.0 micro m and a measurement system inertia of 17.02 micro Nm $\sec^{31\ 2}$.

To make the liquid crystal compositions of the invention is relatively simple because they tend to form spontaneously with little need for the addition of energy to promote transformation to the liquid crystal state. However, to promote uniformity of the composition mixing will normally be undertaken and it has been found desirable first to mix the surfactants and cosurfactant with the water, followed by admixing of the lipophilic component, usually a hydrocarbon (but esters or mixtures of hydrocarbons and esters may also be employed). It is not necessary to employ heat and most mixings are preferably carried out at about room temperature (20–25° C.).

The invented compositions may be applied to such surfaces by pouring onto them, by application with a cloth or sponge, or by various other contacting means but it is preferred to apply them in the form of a spray by spraying them onto the substrate from a hand or finger pressure operated sprayer or squeeze bottle. Such application may be onto hard surfaces, such as dishes, walls or floors, from which lipophilic (usually greasy or oily) soil is to be removed, or may be onto fabrics, such as laundry, which has previously been stained with lipophilic soils, such as motor oil. The invented compositions may be used as detergents and as such may be employed in the same manner in which liquid detergents are normally utilized in dishwashing, floor and wall cleaning and laundering, but it is preferred that they be employed as pre-spotting agents too, in which applications they are found to be extremely useful in loosening the adhesions of lipophilic soils to substrates, thereby promoting much easier cleaning with application of more of the same invented detergent compositions or by applications of different commercial detergent compositions, in liquid, bar or particulate forms.

The various advantages of the invention have already been set forth in some detail and will not be repeated here. However, it will be reiterated that the invention relates to the important discovery that effective liquid detergent compositions can be made in the liquid crystal state and that because they are in such state they are especially effective in removing lipophilic soils from substrates and also are effective in removing from substrates non-lipophilic materials. Such desirable properties of the liquid crystal detergent compositions of this invention make them ideal for use as pre-spotting agents and detergents for them ideal for use as pre-spotting agents and detergents for removing hard-to-remove soils from substrates in various hard and soft surface cleaning operations.

The following examples illustrate but do not limit the invention. Unless otherwise indicated, all parts in these examples, in the specification and in the appended claims are by weight and all temperature are in ° C.

EXAMPLE I

The following formulas (wt. %) were made at 25° C. by simple mixing.

| | A | B | C | D | E |
|---|---|---|---|---|---|
| NaAEOS(2EO) | 12 | 12 | 12 | 12 | 12 |
| 91-5 Dobanol | 3 | 3 | 3 | 3 | 3 |
| Tripropylene glycol n-butyl ether | 11.25 | 11.25 | 11.25 | 11.25 | 11.25 |
| D-Limonene | 3.75 | 3.75 | 3.75 | 3.75 | 3.75 |
| $MgSO_4 \cdot 7H_2O$ | 0.98 | 0.98 | 0.98 | 0.98 | 0.98 |
| PE particles density 0.95 g/liter particle size 300–400 microns | — | — | — | — | — |
| Amorphous hydrated silica Zeofinn | — | 0.2 | 0.5 | 0.8 | 1 |
| Water | Bal. | Bal. | Bal. | Bal. | Bal. |
| Thermal stability ° C. Cleaning easiness index | 18–36 | 18–36 | 18–36 | 18–36 | 18–36 |
| 10% hard tallow | −0.41 | 0 | 0.12 | 0.26 | 0.45 |
| 5% hard tallow & 5% soft beef tallow | −1.5 | −1.2 | 0 | 0 | 0.8 |
| Dried food | −0.5 | — | — | 0 | — |

| | F | G | H | I |
|---|---|---|---|---|
| NaAEOS(2EO) | 12 | 12 | 12 | 12 |
| 91-5 Dobanol | 3 | 3 | 3 | 3 |
| Tripropylene glycol n-butyl ether | 11.25 | 11.25 | 11.25 | 11.25 |
| D-Limonene | 3.75 | 3.75 | 3.75 | 3.75 |
| $MgSO_4 \cdot 7H_2O$ | 0.98 | 0.98 | 0.98 | 0.98 |
| PE particles density 0.95 g/liter particle size 300–400 microns | 1 | 0.5 | 0.2 | 0.8 |
| Amorphous hydrated silica Zeofinn | | 0.5 | 0.8 | 0.2 |
| Water | Bal. | Bal. | Bal. | Bal. |
| Thermal stability ° C. Cleaning easiness index | 18–36 | 18–36 | 18–36 | 18–36 |
| 10% hard tallow | −0.47 | −0.19 | 0.5 | 0.18 |

-continued

|  | | | | |
|---|---|---|---|---|
| 5% hard tallow & 5% soft beef tallow | — | — | — | — |
| Dried food | — | — | — | — |

|  | J | K | L |
|---|---|---|---|
| SLS | — | 12 | 12 |
| SLES-2EO | 12 | — | — |
| 91-5 Dobanol | 8 | 8 | 8 |
| TPnB | 11.25 | 11.25 | 11.25 |
| d-Limonene | 3.75 | 3.75 | 3.75 |
| MgSO4.7H2O | 3.5 | 3.5 | 3.5 |
| MgCL2.6H2O | 3.5 | 3.5 | 3.5 |
| Amorphous hydrated silica Zeofinn | 0.8 | 0.8 | 5 |
| water | bal | bal | bal |
| thermal stability ° C. | 4–43 | 4–43 | 4–43 |
| cleaning easiness index | | | |
| 10% hard tallow | 0.2 | 0.16 | 0.52 |
| baked-on food | 0 | 0.2 | 0.064 |
| soap scum | 0.46 | 0.58 | 0.60 |

The liquid crystal structures J,K,L are have excellent viscoelastic behaviour. Thus we can suspend up to 5–6% amorphous silica.

The Cif formula composition was:

anionic: 2.9% nonionic: 1.4% calite: 35% soap: 0.5%

Evaluation test:

The cleaning performance of the different prototypes was evaluated versus a classical cream cleanser (Cif) as reference. The results are given in terms of cleaning easiness index:

[1-(strokes number proto/strokes number ref)]

If strokes number proto=strokes number ref., then the index is 0 (cleaning equivalence between prototype and reference).

If strokes number proto>strokes number ref. then the index is characterised by a negative value (the more negative the index, the less efficient the prototype).

If strokes number proto<strokes number ref. then the index is characterised by a positive value (the more positive the index, the more efficient the prototype).

The invention has been described with respect to various embodiments and illustrations of it but is not to be considered as limited to these because it is evident that one of skill in the art with the present specification before him or her will be able to utilize substitutes and equivalents without departing from the invention.

What is claimed is:

1. A liquid crystal detergent composition consisting essentially of by weight:

(a) about 3% to about 18% of a nonionic surfactant containing ethylene oxide groups;

(b) about 2% to about 15% of a water soluble salt of an ethoxylated $C_{8-18}$ alkyl ether sulfate surfactant or alkyl sulfate surfactant;

(c) about 0.25% to about 2.0% of a polyethylene powder abrasive having a particle size of 300 to 400 microns and an amorphous silica having a particle size of 8 to about 10 millimeters;

(d) about 3% to about 16% of tripropylene glycol n-butyl ether;

(e) about 1% to about 6% of a water insoluble organic compound selected from the group consisting of d-limonene, terpineol, alpha-pinene, and beta-pinene and mixtures thereof;

(f) about 1% to about 8% of magnesium sulfate heptahydrate; and (g) the balance being water, said liquid crystal detergent composition has a storage modulus measured at a temperature between 20° C. to 40° C., at a strain of 0.1% to 5% and a frequency of 10 radians/second of at least about one Pascal and is clear at a temperature of 8° C. to 43° C. and the composition does not contain any sulfonate surfactant or builder salt.

2. The composition of claim 1, wherein said nonionic surfactant is a condensation product of of a higher fatty alcohol having about 9 to about 11 carbon atoms with 4 to 10 moles of said ethylene oxide groups.

3. The composition of claim 2 wherein said water soluble salt of said ethoxylated $C_{8-18}$ alkyl ether sulfate surfactant has a cation selected from the group consisting of sodium, potassium and ammonium.

* * * * *